United States Patent
Bramley

(10) Patent No.: US 7,200,489 B2
(45) Date of Patent: Apr. 3, 2007

(54) EFFICIENT GEOGRAPHIC NAME SEARCHING SYSTEM AND METHOD

(75) Inventor: Mark Douglas Bramley, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 155 days.

(21) Appl. No.: 11/092,510

(22) Filed: Mar. 28, 2005

(65) Prior Publication Data

US 2006/0217878 A1    Sep. 28, 2006

(51) Int. Cl.
    *G01C 21/00* (2006.01)
(52) U.S. Cl. .................. 701/207; 701/33; 701/35; 701/214
(58) Field of Classification Search .......... 701/33, 701/35, 207, 214; 707/100
    See application file for complete search history.

(56) References Cited

U.S. PATENT DOCUMENTS 4,303,973 A * 12/1981 Williamson, Jr. et al. ..... 700/84
6,970,861 B2 * 11/2005 Messler ................... 707/3
2004/0170153 A1 * 9/2004 Stewart et al. ............. 370/338

* cited by examiner

*Primary Examiner*—Gertrude A. Jeanglaude
(74) *Attorney, Agent, or Firm*—Christensen O'Connor Johnson Kindness PLLC

(57) ABSTRACT

A system and method for efficiently searching for geographic information for named geographic items is presented. Geographic information is organized in a hierarchical manner. The lowest level of the hierarchy is divided into sections, each section corresponding to an area of a geographic region, and includes the available geographic information, including named geographic items, corresponding to that area. Upper levels of the hierarchy are comprised of sections as well. Each section in an upper level corresponds to at least one lower level section, and includes a subset of the geographic information of its at least one lower level section. Geographic names of items previously determined important in a lower level section are included in the subset of geographic information at the corresponding upper level section. Searching for a geographic name begins are the most specific section identified by information from a user, and if not found there, searches upward in the hierarchy.

20 Claims, 7 Drawing Sheets

EFFICIENT GEOGRAPHIC NAME SEARCHING SYSTEM AND METHOD

FIELD OF THE INVENTION

The present invention relates to a system and method for efficiently locating named geographic places on computing devices.

BACKGROUND OF THE INVENTION

Over recent time, geographic, mapping, and navigation information have become widely available to a typical computing device user. Indeed, geographic, mapping, and navigation information is available to personal computers as well as other types of computer devices, such as personal digital assistants (PDAs), hybrid wireless phone/PDAs, on-board navigation devices, and the like. Clearly, some computing devices, especially personal computers, laptops, and the like, are able to locally store, or read computer-readable media having substantial amounts of information. On the other hand, many computing devices, such as handheld computing devices (that include PDAs and hybrid devices), on-board navigation systems, and the like generally do not have large storage capacity, at least for substantial amounts of geographic, mapping, and navigation information.

As an example, FIG. 1 is a pictorial diagram illustrating an exemplary hand-held computing device 100 that could be used to display geographic, mapping, or navigation information to a user. As those skilled in the art will appreciate, such a computing device 100 is usually very limited in the amount of storage available for geographic information. Similarly, FIG. 2 is a pictorial diagram illustrating an exemplary on-board navigation device 200. In order to enable such computing devices to provide geographic, mapping and navigation information (generally referred to as geographic data) to a user, only small portions of the total available geographic information is downloaded to them. Indeed, it is by segmenting geographic information that geographic information providers typically can manage the distribution of information to computing devices, especially to computing devices with limited storage capabilities.

As those skilled in the art will appreciate, geographic information is made available to computing devices in sections, each section corresponding to a particular geographic region. As an example, FIG. 3 illustrates an exemplary region 300 divided into sections, where each section (bounded by dashed lines) corresponds to a block of geographic information that is available for downloading and use by a computing device, such as computing devices 100 and 200. Typically, each section includes all geographic locations and names, as well as routing information corresponding to the physical area within the defined section. For example, assuming the exemplary region 300 corresponds to the Seattle metropolitan area, specific geographic information regarding the downtown area of Seattle would be found in a section corresponding to grid 302.

As should be appreciated, individual sections may include thousands of named items including parks, streets, neighborhoods, landmarks, geographic features, city names, and the like. For example, the second corresponding to grid 302 would include numerous street names, landmarks, parks, and the like as found in the downtown Seattle area. Alternatively, other sections may have very limited information, such as the section corresponding to grid 304 which covers an area of water in the Puget Sound.

Typically, each section of geographic information downloaded to a computing device includes an identifiable list of geographic names corresponding to the various named items in the section. However, unless a named item falls across two sections, an adjacent section typically will not have information regarding named items located in another section. For example, the geographic name list for the section corresponding to grid 302 will likely not include "Alki Point", which is located in grid 306.

Unfortunately, due to the segmented/sectioned organization of geographic information, a computing device had to search successively through numerous sections of geographic information until a sought-for named geographic item was found, or store a single, large list of geographic names for the entire region 300, which is not storage efficient. Clearly, sequentially searching through multiple sections of geographic information to find a named item is, at very best, extremely inefficient. Furthermore, as many computing devices have limited storage capacity, they may not be able to store holding multiple sections of geographic information. In such circumstances, the computing device must swap one section for another, which is also very inefficient because frequently used data may be swapped out (for later retrieval), and because obtaining another section may involve substantial use of limited resources. While it may be necessary on occasions to swap sections, doing so to locate geographically named items in a sequential search of the sections is not ideal.

In light of the current inefficiencies in locating geographically named items among sections of geographic information, what is needed is an efficient system for locating such geographically named items. The present invention addresses this and other items found in the prior art.

SUMMARY OF THE INVENTION

According to aspects of the present invention, a computing device for efficiently locating named geographic items is presented. The computing device includes a processor and a memory. The memory includes at least one section of geographic information. The geographic information is organized in a hierarchical manner including a lowest level and at least one upper level. The lowest level of the hierarchical geographic information for a particular region is divided into sections. Each lowest level section corresponds to an area of the region. Each section includes geographic information for that corresponding area, including named geographic items. Each upper level of the hierarchical geographic information is comprised of upper level sections. Each upper level section corresponds to at least one lower level section and includes a subset of the geographic information from its at least one lower level section. The computing device is configured to search for a named geographic item in the hierarchy of geographic information in response to a user request.

According to additional aspects of the present invention, a computer network system for providing geographic information regarding a geographic named item to a user, is presented. The computer network system comprises a geographic information source, and a computing device communicatively coupled to the geographic information source. The geographic information source has geographic information for a geographic region. The geographic information is organized in a hierarchical manner including a lowest level and at least one upper level. The lowest level of the hierarchal geographic information is divided into sections. Each lowest level section corresponds to a particular area of the geographic region and includes geographic information for its corresponding area, including named geographic items. Each upper level of the hierarchical geographic information is comprised of one or more upper level sections. Each upper level section corresponds to at least one lower level section, and includes a subset of the geographic information from its corresponding at least one lower level section. The computing device has a memory storing at least one section of the hierarchical geographic information, and is configured to search for a named geographic item in the hierarchical geographic information in response to a user request.

According to still further aspects of the present invention, a method for finding geographic information for a named geographic item on a computing device is presented. On the computing device, a name for a geographic item is obtained from a user. Contextual location information regarding the named geographic item is also obtained. The lowest level section of geographic information corresponding to the obtained location information is searched. The geographic information is organized in a hierarchical manner including a lowest level and at least one upper level. The lowest level of the hierarchy is divided into sections. Each lowest level section corresponds to a particular area of a geographic region, and includes geographic information for that corresponding area, including named geographic items. Each upper level of the hierarchical geographic information comprises at least one upper level section. Each upper level section corresponds to at least one lower level section, and includes a subset of the geographic information from its at least one lower level section.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
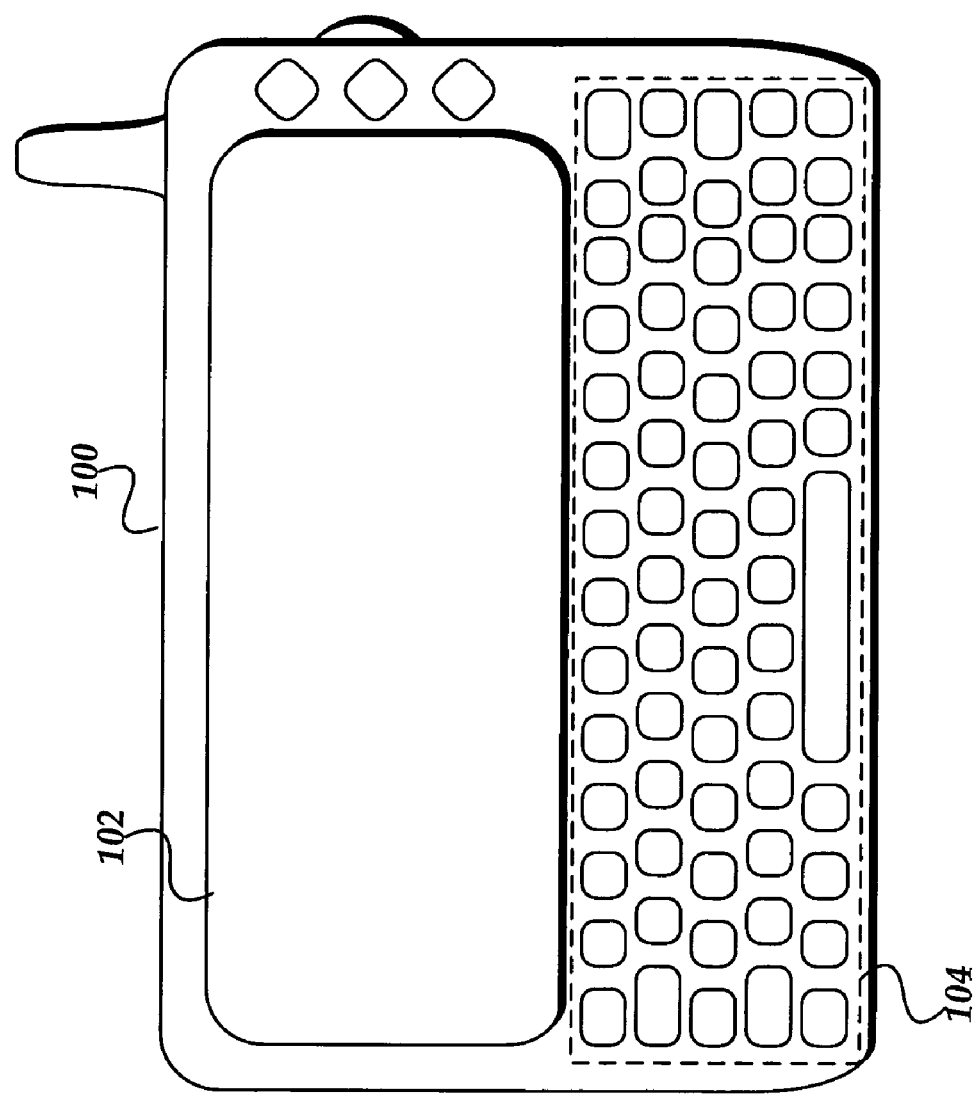
FIG. 1 is a pictorial diagram illustrating an exemplary hand-held computing device configured to display geographic, mapping, or navigation information to a user.
Figure 2:
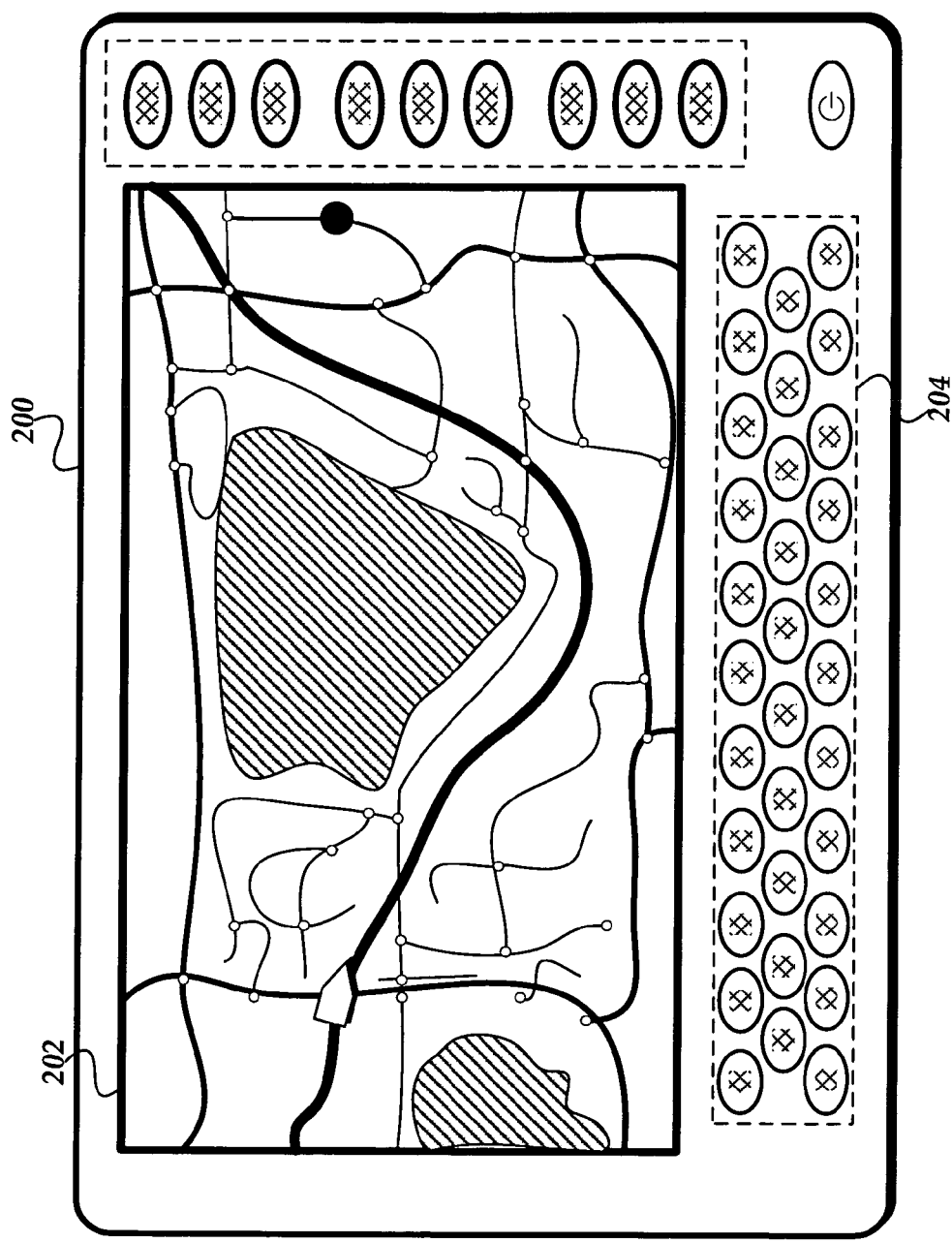
FIG. 2 is a pictorial diagram illustrating an exemplary on-board navigation device configured to display geographic, mapping, or navigation information to a user.

While FIGS. 1 and 2 illustrate exemplary devices upon which the present invention may operate, it should be appreciated that the present invention may be advantageously implemented on a variety of computing devices. For example, while personal computers typically have greater storage capacity than hand-held devices or navigation systems, including the capacity to read high storage capacity removable media, benefits are still realized using the present invention. Such benefits include, but are not limited to, the ability to replace individual sections as they are updated rather than updating an entire database of information, minimal bandwidth usage, in terms of downloading a particular section, as only sections that are required are obtained for local storage, minimal on-computer resource usage, sometimes referred to as a "small footprint", as only used sections are maintained, and the like. Other computer systems, including, but not limited to, laptop computers, tablet computers, and mini- and mainframe computers may similarly benefit.

Figure 4:
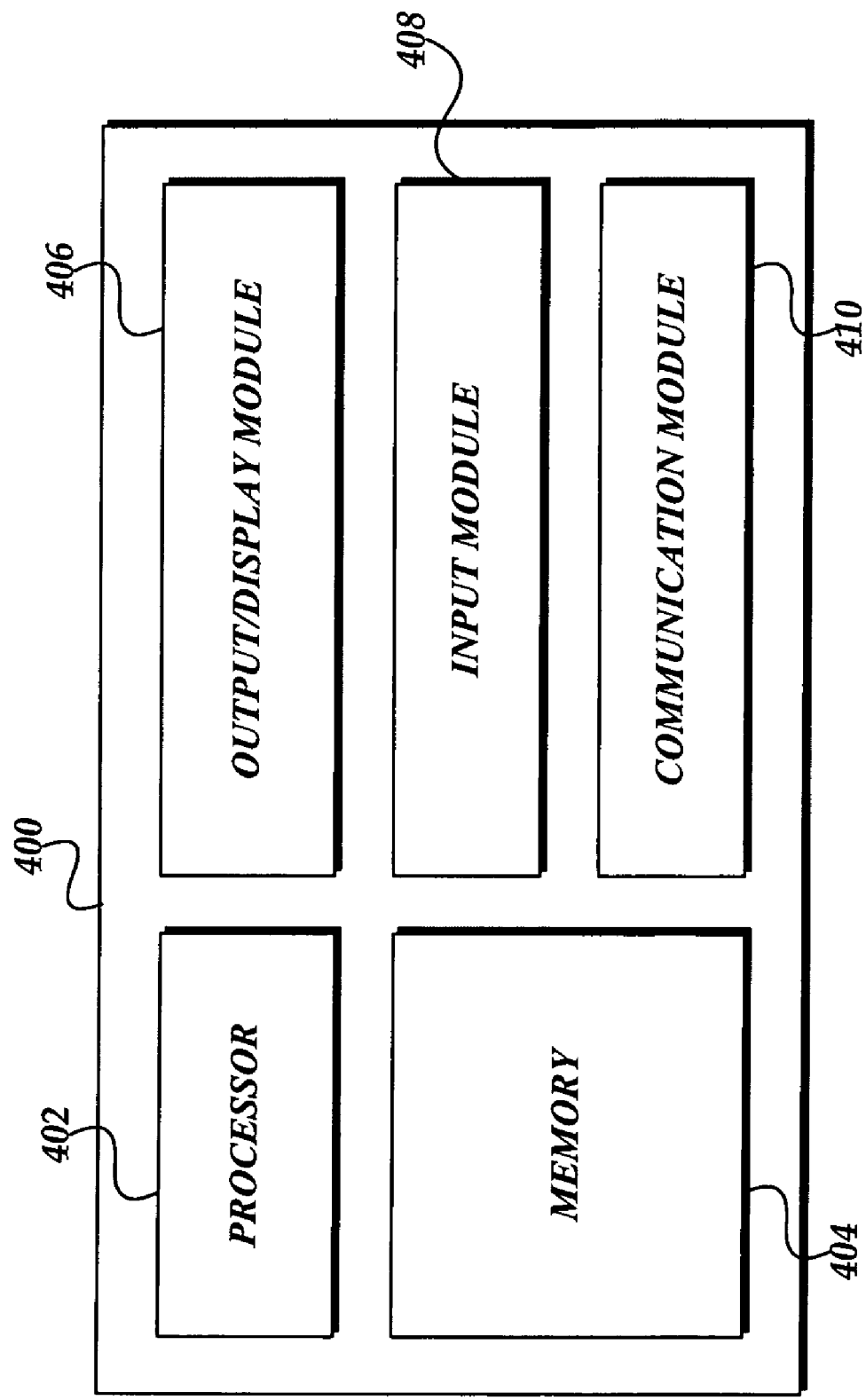
FIG. 4 is a block diagram illustrating components of a generic computing device suitable for utilizing aspects of the present invention.

FIG. 4 is a block diagram illustrating components of a generic computing device 400 suitable for utilizing aspects of the present invention. The computing device includes a processor 402 for, inter alia, locating named geographic items from one or more sections of geographic information, and a memory 404. The memory 404 may include various types of storage, such as random access memory (RAM), read-only memory (ROM), disk-drive storage, optical disk storage, and the like. As such, the memory stores one or more sections of geographic information, and is generally used by the processor 402, in conjunction with executable code, to efficiently locate named geographic items in the geographic information.

The exemplary computing device 400 also includes an output/display module 406. The output/display module is that part of the system through which the computing device displays or conveys results to the user, and in the present case, displays information regarding a named geographic item to a user. While the output/display module 406 may take the embodied form of a display screen, such as display screen 102 (FIG. 1) and 202 (FIG. 2), it may also be a printer, an audio presentation mechanism, or a module connecting the computing device to another, separate system.

The exemplary computing device 400 also includes an input module 408 through which a user enters information regarding a named geographic item. The exemplary computing devices 100 and 200 (of FIGS. 1 and 2, respectively) were illustrated as including keyboard-like input modules 104 and 204. However, these are illustrative only. Other types of input modules that are frequently used include, but are not limited to, touch screens, stylus-sensitive screens and pads, infra-red communication ports, wireless input devices, and the like.

Also included in the exemplary computing device 400 is a communication module 410. The communication module 410 is used to gain access to sections of geographic information from a geographic information source (not shown). In a typical embodiment, the communication module 410 may be a wireless module that obtains information from a geographic information source wirelessly. However, the present invention should not be construed as limited to obtaining geographic information over wireless connections. In an alternative embodiment, the communication module 410 is connected to a geographic information source over a wired connection via a network, such as the Internet. Typically, the communication module 410 obtains geographic information from the geographic information source in an on-demand fashion. In other words, the communication module 410 obtains geographic information only as directed and when such information is needed to process a user request.

Of course, those skilled in the art will recognize that an exemplary computing device 400 suitable for implementing and utilizing aspects of the present invention will likely include other components than those described above. For example, many hand-held devices and navigation devices will typically also include a location sensing module, such as a global positioning system (GPS) unit, for providing the present location of the computing device. Accordingly, the above described components should be viewed as illustrative, but not construed as limiting upon the present invention.

Figure 3:
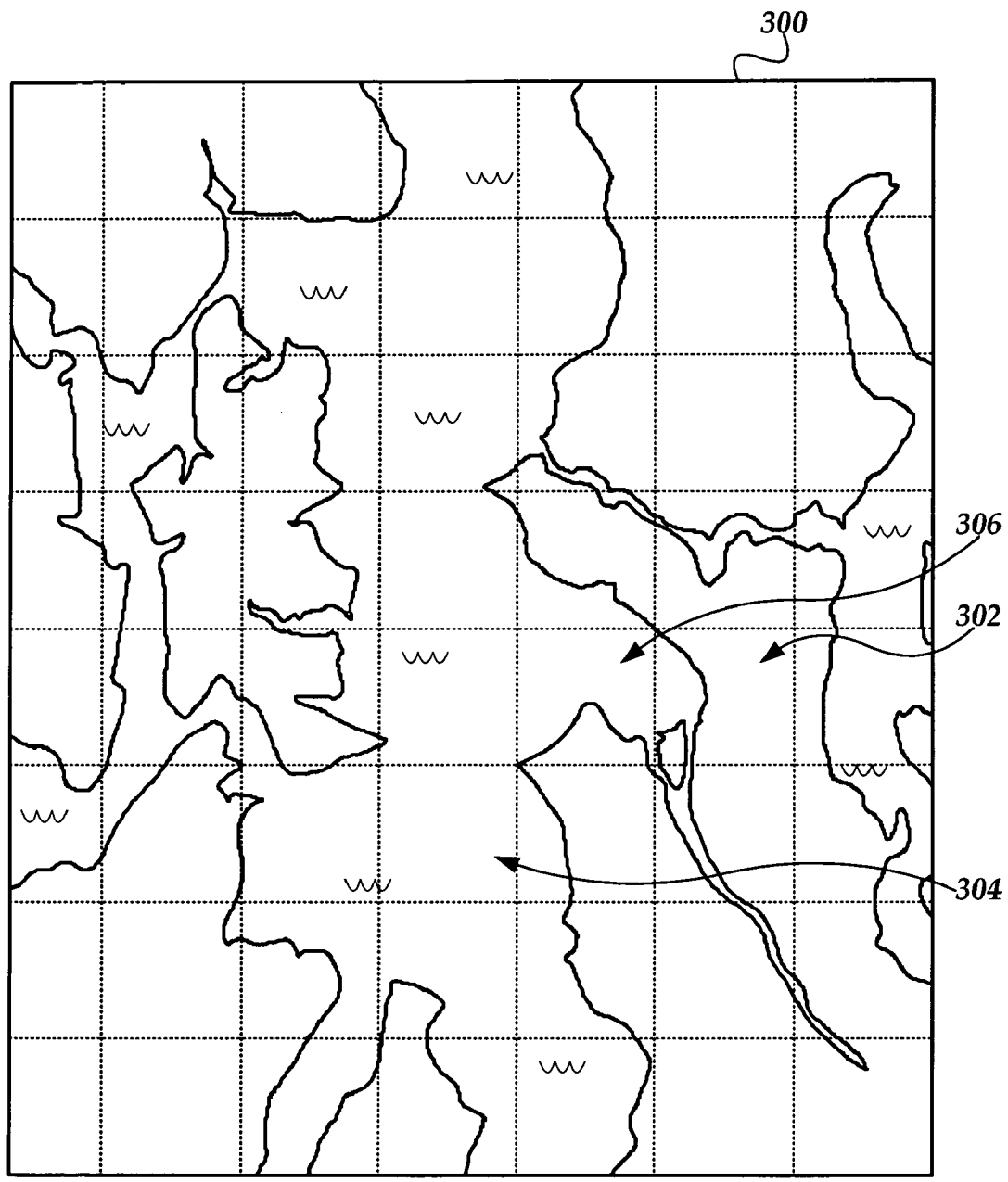
FIG. 3 illustrates an exemplary region divided into sections, where each section (bounded by dashed lines) corresponds to a block of geographic information that is available for downloading and use by a computing device.

As mentioned above, according to aspects of the present invention, geographic information, including named geographic items, for an area/region is divided into sections. As illustrated in FIG. 3, each section may be of the same size, such as sections 302, 304, and 306. However, according to the present invention, sections need not be organized such that they correspond to similar sized geographic regions/areas. Furthermore, in one embodiment and as shown in FIG. 3, each section may correspond to a rectangular geographic area/region. Nevertheless, in an alternative embodiment, sections may correspond to any number of geographic polygons or areas, as well as both contiguous and discontiguous areas and shapes. While sections may correspond to similarly sized geographic regions, as shown in FIG. 3, similarly sized geographic regions/areas are not to be considered as limitations of the present invention. Typically, one section will not overlap another, i.e., the geographic area/region corresponding to a first section will not intersect with the geographic area/region corresponding to a second section.

Each section includes all geographic information corresponding to the area/region bounded by the section, including information corresponding to navigation, mapping, routing, and named geographic items. Typically, each section will also include or be aware of its specific boundaries, though this is not necessary to the present invention.

In addition to segmenting geographic information for a region into sections, according to aspects of the present invention, the geographic information is organized in a hierarchical fashion. More particularly, the geographic information is organized such that at the lowest level comprises the sections of geographic information described above, that contain all geographic information for the area/region bounded by the section. Upper levels of the hierarchical organization include upper level sections that correspond to one or more lower level sections. The upper level sections include information regarding each of its corresponding lower level sections, such as boundaries of the lower level sections and, in particular, named geographic items from the lower level sections that have been identified as important.

Figure 5:
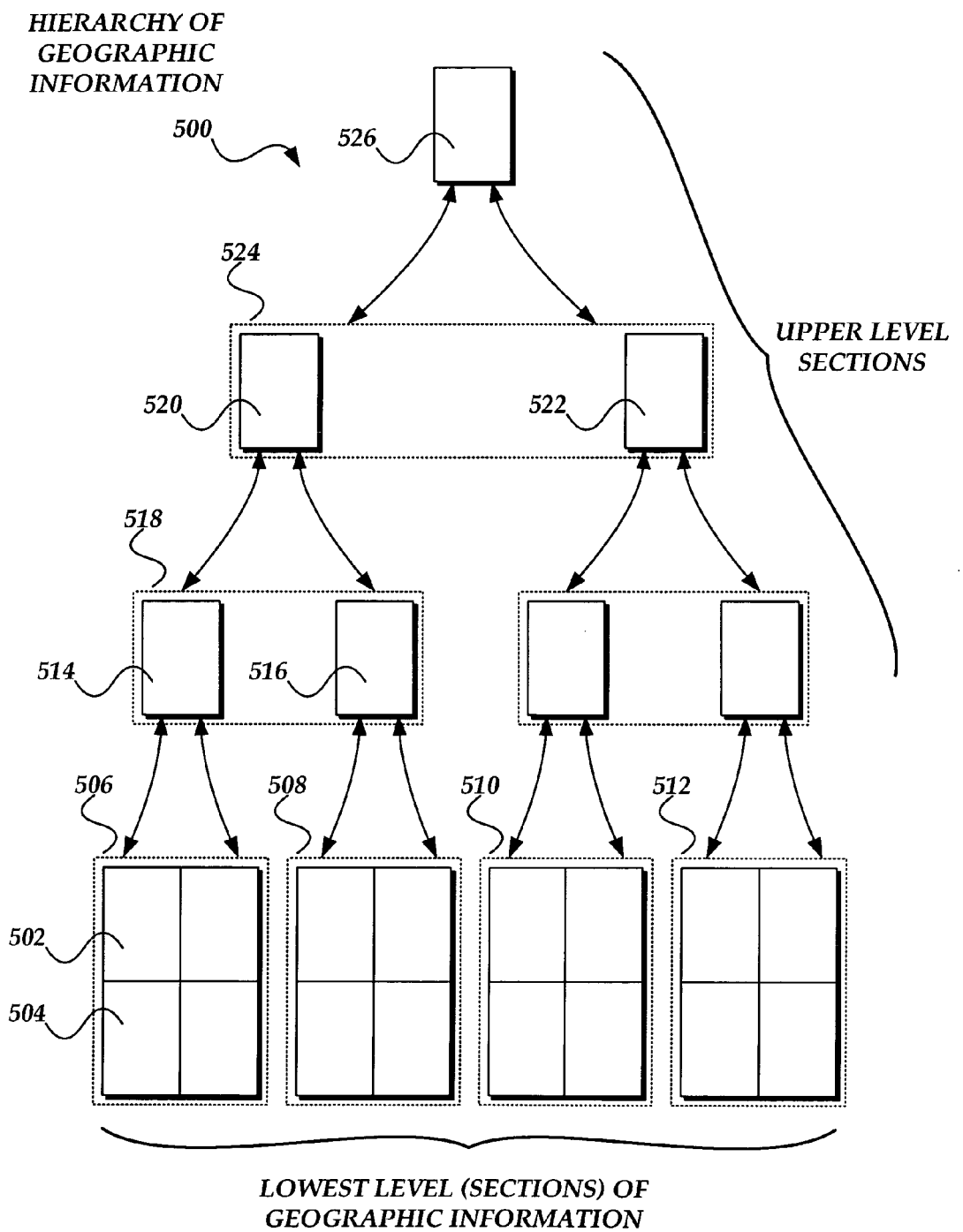
FIG. 5 is a block diagram illustrating an exemplary hierarchy for arranging geographical named information and data according to aspects of the present invention.

FIG. 5 is a block diagram for illustrating an exemplary hierarchy 500 of geographical information according to aspects of the present invention. As indicated above, at the bottom level are the sections, such as sections 502 and 504, that include all geographic information corresponding to the area bounded by the borders of the section. Each of these bottom level sections correspond to a section on an upper level in the hierarchy. For example, the bottom level sections of the exemplary hierarchy 500 have been logically grouped together, as indicated by groupings 506, 508, 510, and 512, and information from these sections are included in the corresponding upper level section. For instance, geographic information from the grouping 506, that includes sections 502 and 504, is incorporated into upper level section 514.

Of course, not all geographic information from each lower level section is included in the corresponding upper level section. In fact, only important geographic information for the lower level sections, such as significant landmarks, natural features, highways, and the like, is incorporated into the upper level sections. Determining whether geographic information is important can be made automatically according to predetermined heuristics, or alternative, may be made according to personal, subjective criteria and left to an implementer's discretion. In any event, the present invention should not be construed as limited to any particular method of determining what are "important" geographic items.

As mentioned above, this information will typically include information such as the boundaries of its corresponding lower level sections and named geographic items (e.g., streets, parks, landmarks, neighborhoods, etc.). In fact, it is anticipated, though not strictly required, that each upper level section will require less storage than its corresponding lower level sections, thus enabling a computing device to store at least one lowest-level section and information about neighboring sections (as found in the upper level sections).

With regard to the exemplary hierarchy 500 of FIG. 5, upper level sections 514 and 516 are grouped together, grouping 518, and correspond to upper level section 520. This upper level section 520 is then grouped (i.e., grouping 524) with upper level section 522 and correspond to an upper-most section 526. Conceptually, one might consider the upper level section 526 as containing information for the entire North America, or the world.

One of the advantages realized by the hierarchical organization of geographic information is that, when searching for named geographic items, important items will be included in upper level sections if they are not located within a particular lower level section. For example, assume a user with a hand-held computing device, such as hand-held device 100 of FIG. 1, stored section 302 of FIG. 3, requested information regarding "Alki Point", which from above, we know is found in section 306. After determining that "Alki Point" is not found in section 302, rather than linearly searching adjacent sections to locate the requested, named geographic location, the hand-held device 100 could move up a level in the hierarchy. Assuming "Alki Point" is deemed to be important, it would also be found in an upper level section, including information as to which section "Alki Point" is actually located. It is anticipated that by including only important geographic information from its corresponding lower level sections, as well as necessary information to identify its corresponding lower level sections, each upper level sections will be substantially smaller, in terms of the amount of geographic information that is included in the upper level section, than the corresponding lower level sections While FIG. 5 illustrates an exemplary hierarchy 500, it should be appreciated that this particular organization is illustrative only, and should not be construed as limiting upon the present invention. For example, the groupings of sections as well as the depth of the hierarchy is illustrative and exemplary, and should not be construed as limiting upon the present invention.

Figure 6A:
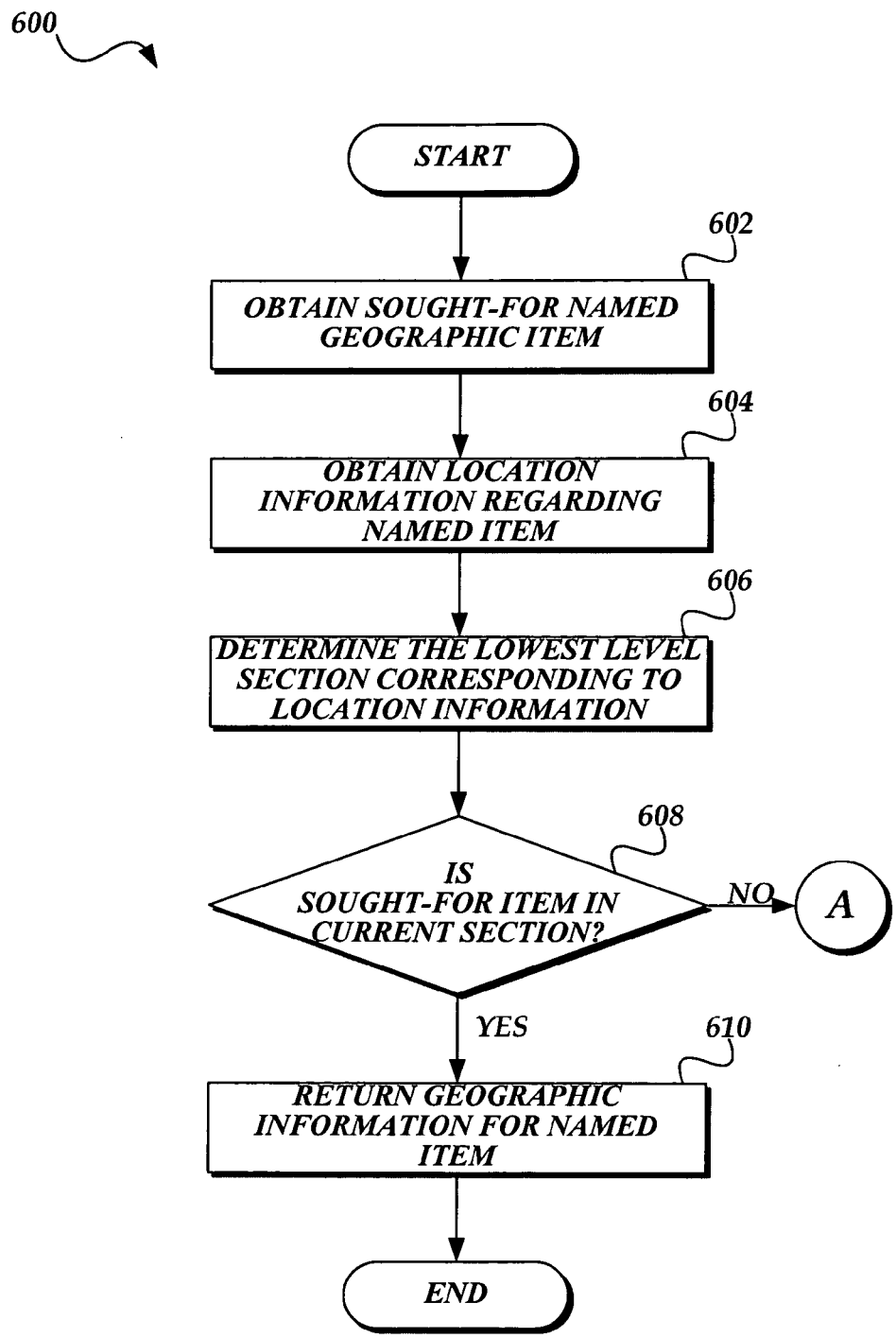
FIGS. 6A and 6B are a flow diagram illustrating an exemplary routine, implemented on a computing device, for efficiently locating a named geographic item/location using hierarchical geographic information.
Figure 6B:
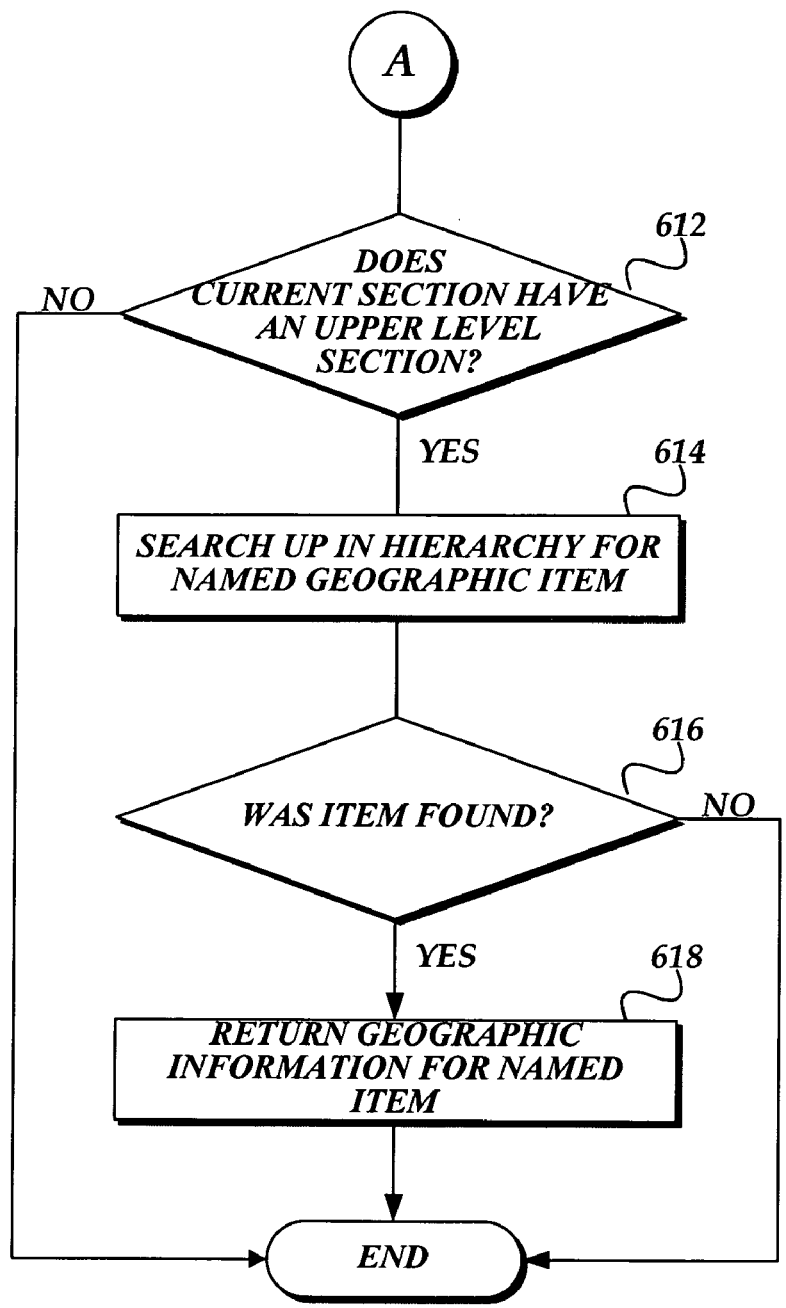

FIGS. 6A and 6B illustrate a flow diagram of an exemplary routine 600, executed on a computing device, for locating a named geographic item/location from geographic information organized in a hierarchical manner as described above. Beginning at block 602, the exemplary routine 600 obtains the name of a geographic location/item, whose specific location and/or directions to that location are sought. At block 604, as much contextual information regarding the location of the named geographic location is also obtained. For example, if geographic information, such as routing or location information, of Alki Point were requested, the exemplary routine 600 would also obtain as much information from the user as the user is able/willing to provide, such as "Seattle, Wash., USA." While not shown in FIGS. 6A and 6B, in addition to obtaining context information from the user, or as an alternative, contextual information may be obtained from other sources, including, but not limited to, a GPS module associated with the computing device, a currently displayed map on the computing device, and the like.

After obtaining the information discussed above, at block 606, the exemplary routine 600 then uses the user-supplied information and the hierarchical geographic information to find the lowest level section that matches the user-supplied information. For example, using the hierarchical geographic information, a section corresponding to Seattle, Wash., USA, is located. Of course, this may or may not be a lowest-level section in the geographic data.

At decision block 608, a determination is made as to whether information regarding the sought for named geographic location is found in the current section. In an actual embodiment, the determination is made using a text indexing scheme via a multi-way trie data structure, though the invention is not so limited.

If the sought for named geographic location is found in the current section, at block 610, the geographic information for that named location is relayed to the user in response to the user's request, and the routine 600 terminates. Alternatively, if the named geographic location is not found in the current section, at block 612 a determination is made as to whether the current section corresponds to an upper level section, i.e., is there an upper level section for this current section. If so, at block 614, the exemplary routine 600 attempts to locate the named geographic location by searching up, assuming that perhaps the named geographic location is found in a nearby section and that it is an important location that its information was promoted to its immediate upper-level section (and possibly higher, depending on its actual or perceived importance). By looking up one level, the routine 600 assumes that the user was correct, or generally correct, when entering the location information. In one embodiment, the process looks up the geographic information hierarchy for the sought-for named geographic item in an iterative manner at each upper level section, until an upper level section is found containing the sought-for named geographic item, or until the top level of the geographic information hierarchy has been searched. Alternatively, a limit as to how far up the hierarchy is searched may be established.

At decision block 616, a determination is made as to whether the sought-for named location is found in one of the upper-level sections. If so, at block 618, the geographic information is returned, and the routine 600 ends. If the sought-for named geographic item was not found, the exemplary routine 600 terminates.

In an alternative embodiment (not shown), if the sought-for named geographic item is not found in the user-specified section and corresponding upper level sections, the exemplary routine 600 may request additional information from the user, or begin a search of adjacent sections for the sought-for information. Adjacent sections may or may not already be located on the computing device and may need to be downloaded to perform the search.

It should be understood that in addition to searching for the sought-for named geographic item, the computing device is also checking as to whether the necessary sections are locally available for searching. If not, the computing device contacts its geographic information source and obtains the sections of the geographic information that are presently needed. This, of course, may require that sections currently available on the computing device are discarded, as the computing device may have only limited storage capacity.

While various embodiments, including the preferred embodiment, of the invention have been illustrated and described, it will be appreciated that various changes can be made therein without departing from the spirit and scope of the invention.

The embodiments of the invention in which an exclusive property or privilege is claimed are defined as follows:

1. A computing device for efficiently locating named geographic items, the computing device comprising:
   a processor; and
   a memory, the memory including at least one section of geographic information, wherein the geographic information is organized in a hierarchical manner including a lowest level and at least one upper level, such that the lowest level of the hierarchy the geographic information of a region is divided into sections, each section corresponding to a particular area of the region and including geographic information for that corresponding area including named geographic items, and such that each upper level comprises upper level sections corresponding to at least one lower level section and including a subset of the geographic information from its at least one lower level section;
   wherein the computing device is configured to search for a named geographic item in the hierarchy of geographic information in response to a user request.

2. The computing device of claim 1, wherein the subset of the geographic information from the at least one lower level section comprises named geographic items from the at least one lower level section that were previously identified to be included in the upper level section.

3. The computing device of claim 2, wherein the subset of the geographic information from the at least one lower level section further comprises information regarding the identity of the at least one lower level section.

4. The computing device of claim 3 further comprising:
   an input module configured to receive the request from a user for geographic information regarding the geographic name; and
   an output module for outputting the results of the search for the geographic name.

5. The computing device of claim 4 further comprising a communication module for obtaining additional sections of the hierarchical geographic information from a geographic information source.

6. The computing device of claim 5, wherein the communication module obtains additional sections of the hierarchical geographic information from the geographic information source in an on-demand fashion.

7. The computing device of claim 6, wherein the computing device, in response to the user request, is configured to search for the geographic name in the lowest level section of geographic information corresponding to the amount of detail provided by the user in the request, and if not found, search for the geographic name in an upper level section that corresponds to the currently searched section.

8. A computer network system for providing geographic information regarding a geographic named item to a user, the computer network system comprising:
   a geographic information source having geographic information for a region, the geographic information being organized in a hierarchical manner including a lowest level and at least one upper level, such that the lowest level of the hierarchy is divided into sections, each lowest level section corresponding to a particular area of the region and includes geographic information for that corresponding area, including named geographic items, and each upper level of the hierarchical geographic information comprises upper level sections, each upper level section corresponding to at least one lower level section and including a subset of the geographic information from its at least one lower level section; and a computing device, communicatively coupled to the geographic information source, having a memory storing at least one section of the hierarchical geographic information, and configured to search for a named geographic item in the hierarchy of geographic information in response to a user request.

9. The computer network system of claim 8, wherein the subset of the geographic information from the at least one lower level section comprises named geographic items from the at least one lower level section that were previously identified to be included in the upper level section.

10. The computer network system of claim 9, wherein the subset of the geographic information from the at least one lower level section further comprises information regarding the identity of the at least one lower level section.

11. The computer network system of claim 10, wherein the computing device further comprises:

an input module configured to receive the request from a user for geographic information regarding the geographic name; and an output module for outputting the results of the search for the geographic name.

12. The computer network system of claim 11, wherein the computing device further comprises a communication module for obtaining additional sections of the hierarchical geographic information from the geographic information source.

13. The computer network system of claim 12, wherein the communication module obtains additional sections of the hierarchical geographic information from the geographic information source in an on-demand manner.

14. The computer network system of claim 12, wherein the computing device, in response to the user request, is configured to search for the geographic name in the lowest level section of geographic information corresponding to the amount of detail provided by the user in the request, and if not found, search for the geographic name in an upper level section that corresponds to the currently searched section.

15. A method for finding geographic information for a named geographic item on a computing device, the method comprising:

on the computing device:

obtaining a name for a geographic item from a user;

obtaining location information regarding the named geographic item from the user; and searching the lowest level section of geographic information corresponding to the obtained location information, wherein the geographic information is organized in a hierarchical manner including a lowest level and at least one upper level, such that the lowest level of the hierarchy is divided into sections, each lowest level section corresponding to a particular area of a geographic region and includes geographic information for that corresponding area, including named geographic items, and each upper level of the hierarchical geographic information comprises at least one upper level section, each upper level section corresponding to at least one lower level section and including a subset of the geographic information from its at least one lower level section.

16. The method of claim 15 further comprising identifying the lowest level section of the hierarchical geographic information corresponding to the location information obtained from the user in the request, and searching the identified section for the named geographic item.

17. The method of claim 16 further comprising determining whether the lowest level section of the hierarchical geographic information corresponding to the location information obtained from the user in the request is available on the computing device, and if not, obtaining the lowest level section of the hierarchical geographic information corresponding to the location information obtained from the user in the request from the geographic information source.

18. The method of claim 16 further comprising searching an upper level section that corresponds to the identified section if the geographic name is not found in the identified section.

19. The method of claim 18 further comprising iteratively search corresponding upper level sections in the hierarchical geographic information until the geographic name is found in an upper level section or until the top-most level of the hierarchical geographic information is searched.

20. The method of claim 19 further comprising searching an adjacent section of the identified section if the geography name is not found in the identified section and the upper level section.

* * * * *